No. 793,024. Patented June 20, 1905.

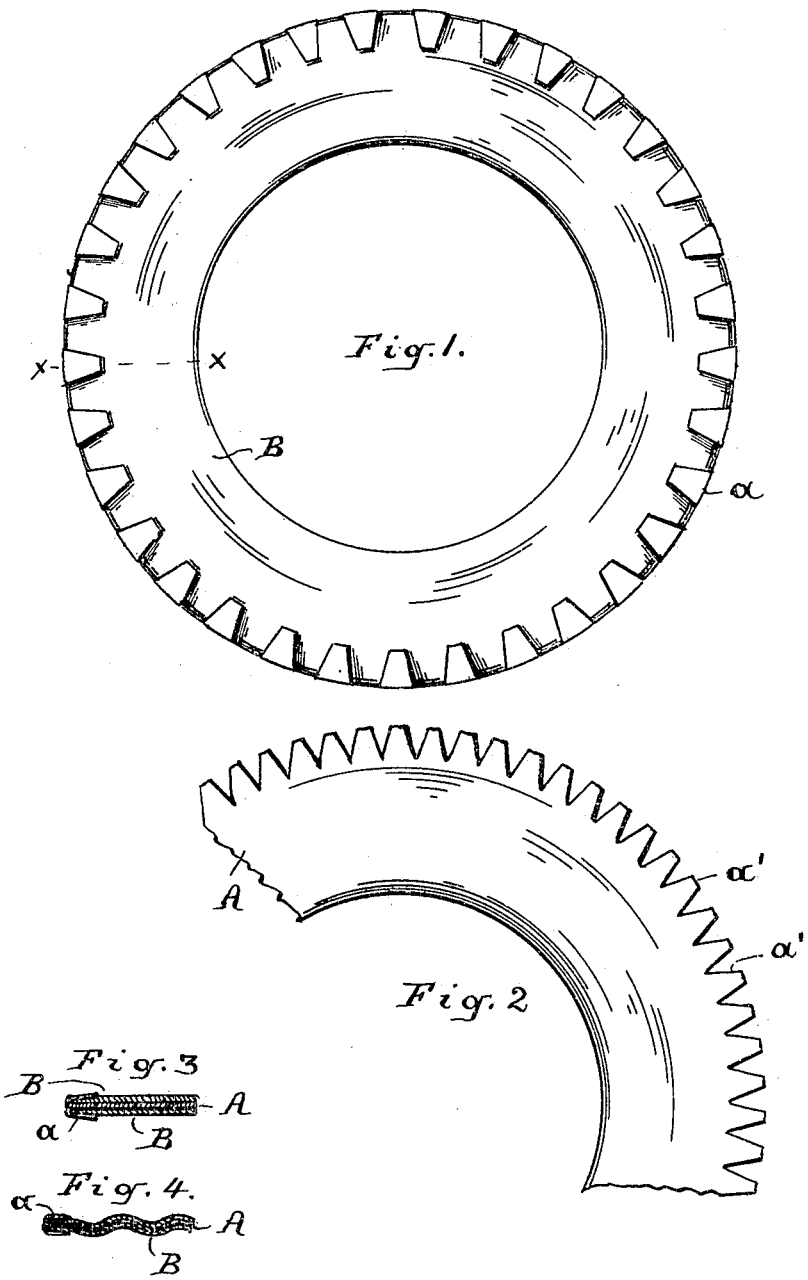

UNITED STATES PATENT OFFICE.

HENRY C. ROENTGEN, OF CLEVELAND, OHIO.

LAMINATED PIPE-GASKET.

SPECIFICATION forming part of Letters Patent No. 793,024, dated June 20, 1905.

Application filed September 23, 1904. Serial No. 225,653.

*To all whom it may concern:*

Be it known that I, HENRY C. ROENTGEN, a citizen of the United States, residing at Cleveland, in the county of Cuyahoga and State of Ohio, have invented certain new and useful Improvements in Laminated Pipe-Gaskets, of which the following is a specification.

My invention relates to improvements in gaskets used between the joints of pipe-lines, &c.; and the object of my improvement is to provide a gasket for such purposes which is readily applicable and durable in point of service. I attain this object in a gasket constructed and compiled as shown in the following drawings, in which—

Figure 1 represents a face view of the gasket complete. Fig. 2 is a partial face view of the inner binding member therefor. Fig. 3 represents a sectional view on line X X, and Fig. 4 represents a modification thereof.

Like letters of reference denote like parts in the drawings and specification.

In the main this my improved gasket consists of the inner member A and the outer members B B. For the inner member a metallic substance is used, (preferably copper or the like,) while the outer members consist of a soft pliable material, (rubber or the like,) and the latter members are preferably cemented unto the former member. As an additional means of securing or uniting the outer members with the inner member prongs $a$ are formed around the circumference of said inner member, and alternately said prongs are bent over one and the other of the adjoining members B B. Such prongs may be provided around the inner circle of the gasket, as well as around the outer circumference thereof, or, as shown, they may only extend around the outer circumference to serve as retainers for the yielding members B B and to guard against their being blown out between the pipe-flanges, for which they are intended to form a gas or liquid tight joint. Furthermore, in gaskets of large size—say ten inches or more—the inner member A may be corrugated, (see Fig. 4,) so as to impart stiffness to such structures, which is essential in order to facilitate the insertion of such gaskets between the pipe-flanges.

Originally the inner or metallic member A is cut out of sheet metal with a diameter larger than that of the pipe-flanges. Subsequently the serrations $a'$ are produced, and finally said serrations are bent over alternately in opposite direction to serve as binding mediums for the yielding layers B B upon each side of the member A. A lamination of such metallic and non-metallic layers or members possesses the necessary yielding quality and is practically well-nigh indestructible.

What I claim, and desire to secure by Letters Patent, is—

1. A pipe-gasket consisting of non-metallic members and a metallic member interposed between the first-mentioned members and having prongs which alternately impinge upon one or the other of said non-metallic members in the manner as shown and for the purpose set forth.

2. In a pipe-gasket, the combination with non-metallic members, of a metallic member having prongs overlapping each of the non-metallic members in the manner as and for the purpose set forth.

HENRY C. ROENTGEN.

Witnesses:
B. F. EIBLER,
M. S. PARR.